US009469341B2

(12) United States Patent
Dornhege

(10) Patent No.: US 9,469,341 B2
(45) Date of Patent: Oct. 18, 2016

(54) METHOD OF PERFORMING CONTROL OF A STEERING AID FOR A STEERING SYSTEM OF A VEHICLE

(71) Applicant: FORD GLOBAL TECHNOLOGIES, LLC, Dearborn, MI (US)

(72) Inventor: Jens Dornhege, Pulheim (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 103 days.

(21) Appl. No.: 14/170,065

(22) Filed: Jan. 31, 2014

(65) Prior Publication Data

US 2014/0222291 A1   Aug. 7, 2014

(30) Foreign Application Priority Data

Feb. 1, 2013   (DE) .......................... 10 2013 201 677

(51) Int. Cl.
*B62D 6/10* (2006.01)
*B62D 5/04* (2006.01)

(52) U.S. Cl.
CPC ............... *B62D 6/10* (2013.01); *B62D 5/0457* (2013.01); *B62D 5/0481* (2013.01); *B62D 5/0484* (2013.01)

(58) Field of Classification Search
None
See application file for complete search history.

(56) References Cited

U.S. PATENT DOCUMENTS

| 4,786,866 A * | 11/1988 | Yabe et al. ....................... 701/43 |
| 5,283,741 A * | 2/1994 | Desrus ................. B62D 5/0457 701/41 |
| 5,636,137 A * | 6/1997 | Hazelden .................. G01L 3/12 318/640 |
| 6,497,303 B1 * | 12/2002 | Nishimura ........... B62D 5/0487 180/443 |
| 6,580,990 B2 * | 6/2003 | Wager et al. .................... 701/43 |
| 8,392,055 B2 | 3/2013 | Schusteritz |
| 2009/0091475 A1 * | 4/2009 | Watanabe ............ B62D 15/028 701/41 |
| 2009/0150018 A1 * | 6/2009 | Brown et al. ................... 701/42 |
| 2010/0256870 A1 * | 10/2010 | Klein .............................. 701/41 |
| 2010/0305803 A1 * | 12/2010 | Schusteritz .......... B62D 5/0481 701/31.4 |
| 2011/0218704 A1 * | 9/2011 | Kanekawa et al. ............. 701/34 |
| 2014/0121884 A1 * | 5/2014 | Engels ......................... 701/29.2 |

FOREIGN PATENT DOCUMENTS

DE   102006017775 A1   10/2007

OTHER PUBLICATIONS

Examination Report issued in corresponding German Patent Application No. 10 2013 201 677.8, dated Apr. 8, 2014, Machine translated (Google translate).

* cited by examiner

Primary Examiner — Rami Khatib
Assistant Examiner — David Merlino
(74) Attorney, Agent, or Firm — Jones Robb, PLLC; Raymond L. Coppiellie

(57) ABSTRACT

In accordance with various exemplary embodiments, the present disclosure provides a method for controlling a steering aid for a steering system of a vehicle. Upon activation of a vehicle in which a steering aid has been deactivated, a signal instructing a driver to rotate a steering wheel of the steering system without a steering assist motor can be generated. Whether rotation of the steering assist motor occurs during rotation of the steering wheel can be determined. The steering aid can be activated when the steering assist motor has rotated.

20 Claims, 4 Drawing Sheets

METHOD OF PERFORMING CONTROL OF A STEERING AID FOR A STEERING SYSTEM OF A VEHICLE

CROSS REFERENCE TO RELATED APPLICATIONS

This application claims priority to German Application No. 102013201677.8, filed on Feb. 1, 2013, the entire content of which is incorporated by reference herein.

TECHNICAL FIELD

The present disclosure relates generally to a method for performing control of a steering aid within a steering system. In particular, the present disclosure relates to a method for performing control of a steering aid within a steering system of a motor vehicle.

INTRODUCTION

Motor vehicles can be equipped with a steering aid which facilitates steering of the motor vehicle. The steering aid can be referred to as power steering, which acts in a hydraulically assisting fashion (HPAS), an electrically assisting fashion (EPAS or EPS), or an electrohydraulically assisting fashion (EHPAS) on a steering activity generated by the driver of the motor vehicle. The steering aid can comprise an actuator drive to transmit a desired auxiliary torque for steering the motor vehicle. The electric steering aid can be configured in such a way that a steering activity (e.g., torque) generated by the driver of the motor vehicle can be detected automatically and boosted electrically. When the motor vehicle is traveling at a high speed, steering assistance can be boosted less than when the motor vehicle is traveling at a lower speed. For example, when parking or traveling in town traffic at a relative lower speed, the number of steering movements or the amount of torque applied by the driver can result in an increased level of assistance from the steering aid.

Conventionally, ball-and-nut-driven toothed steering racks have been implemented in steering systems for motor vehicles. For example, in belt drive EPAS, the steering support is generated in an electric motor on the steering gear and is transmitted via a toothed belt to a recirculating ball nut which is secured in the steering gear. The recirculating ball nut then in turn moves the steering rack to the left or to the right. The toothed steering racks can be assisted by an electric steering aid during the steering activation. In the conventional systems, the steering-assisting force can be transmitted from an electric motor to a ball-and-nut spindle gear mechanism or the toothed steering rack in order to deflect the steering system or the vehicle wheels arranged thereon.

Corrosion can be formed on the components of the gear mechanism when moisture is introduced into the system. For example, when corrosion affects the ball and nut or the ball and nut bearing, this brings about increased internal friction. Similarly, in the region of the ball nut, the ingress of dirt also may lead to increased friction as may mechanical defects. An increase in internal friction can result in an increase in steering force required by the driver despite the presence of the steering aid.

As a result of the high gear mechanism ratio due to the ball-and-nut gear mechanism, the portion of the frictional force generated by the internal friction expressed with respect to the driving force of the electric assistance depends precisely on the driving direction. If the assisting electric motor drives the fast running side of the gear mechanism, the relative frictional loss as a result of the internal friction is low. However, if the gear mechanism is driven by the slowly running side in the case of a passive electric motor, the percentage friction loss increases dramatically. Such increases in friction in the ball nut gear can result in the gear becoming self-locked. Algorithms for detecting and for checking coefficients of friction of the steering system are known, which either calculate hysteresis forces in a changeover of the direction of movement or compare a measured steering force with a predetermined steering force associated with a reference model of the vehicle.

In order to calculate the steering assistance, electric power steering systems can use a separate torque sensor assigned to the steering system for measuring the steering torque which is applied to the steering wheel by the driver. This torque sensor can measure the torque, but can also be combined with a rotational angle sensor. Alternatively, an indirect torque measurement can be determined by means of the rotational angle of two parts of the steering column or of the steering gear which are connected to an elastic element, such a torsion bar. In addition, a direct torque measurement, such as a magneto-elastic principle, can be taken on a component of the steering train to determine the torque.

The torque sensor can be coupled to the power steering system (EPAS system) and can be, if appropriate, integrated into the EPAS system. The torque measurement can be used, depending on the an open-loop control or a closed-loop control of the steering system, to boost the steering input from the driver in the sense of steering assistance in the same direction or else to apply constant torque to the steering wheel in order to give the driver feedback about the steering angle or other vehicle movement dynamic driving parameters. Alternatively, the torque measurement can be based on the position of the deflected front wheels. For example, an angle sensor can determine the position of the wheels. A linear sensor can also be used to determine a torque measurement using a linear sensor in the steering gear. The torque measurement by means of the torque sensor or the determination of the position of the front wheels by means of the angle sensor alone can provide for determining frictional forces within the system. However, the torque measurement cannot be used to differentiate between different types of frictional forces such as internal frictional force and external frictional force. An internal force associated with a steering assist system can be caused, for example, by corrosion such as rust to a ball and nut or ball and nut bearing, to the ingress of dirt to the ball and nut assembly, or by mechanical damage. An external force can be caused by defective parts within a front wheel suspension system or friction external to the steering system of the vehicle. For example, an unusually high friction caused by road conditions. Additional sources of friction force external to the steering assist motor can include friction caused by a pinion-rack gear mesh and a rack to rack housing. While increase in internal friction will require unacceptably high steering efforts by the driver if steering assist is lost, external friction will not require such additional efforts because the friction is not located inside the high ratio gear.

Because a differentiation between different types of frictional force cannot be determined in conventional systems, the EPAS can be unnecessarily removed (disabled). For example, the system can calculate an increase in friction and identify the increase as an internal increase in friction when the increase is actually caused by an increase in external friction. As a result, the system attributes the increase to a defected ball and nut or ball and nut bearing rather than the front wheel suspension and deactivates the steering aid in the EPAS system.

For example, in conventional systems, when the frictional force is determined to be outside a predetermined range, the steering aid can be disengaged at the next ignition process (i.e. before the vehicle is next activated) rather than immediately after an increased friction is determined. This can prevent an unacceptably high steering activation force caused by disengaging the steering aid while the vehicle is currently in motion because the decision to disengage the steering aid is based on the overall determined frictional force rather than the type of frictional force, the steering aid can be disengaged even though the steering gear is intact. This can lead to a situation that would prevent a vehicle from being activated even though the vehicle has not experienced damage to the steering system such as the steering gear. Alternatively, the vehicle can be activated but the steering aid can remain deactivated. This is very inconvenient, in particular in regions in which large distances have to be covered from one inhabited location to the next inhabited location, such as, for example, in Australia or in Russia.

It may be desirable, therefore, to provide a system to control activation of a steering aid based on the type of frictional force present.

SUMMARY

In accordance with various exemplary embodiments, the present disclosure provides a method for controlling a steering aid for a steering system of a vehicle. Upon activation of a vehicle in which a steering aid has been deactivated, a signal instructing a driver to rotate a steering wheel of the steering system without a steering assist motor can be generated. Whether rotation of the steering assist motor occurs during rotation of the steering wheel can be determined. The steering aid can be activated when the steering assist motor has rotated.

In accordance with another exemplary embodiment, the present disclosure provides a system for controlling a steering aid for a steering system of a vehicle. The system can comprise a control unit configured to generate a signal instructing a driver to rotate a steering wheel of the steering system without a steering assist motor upon activation of a vehicle in which a steering aid has been deactivated. The control unit can be further configured to determine whether rotation of the steering assist motor occurs during rotation of the steering wheel and activate the steering aid when the steering assist motor has rotated.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
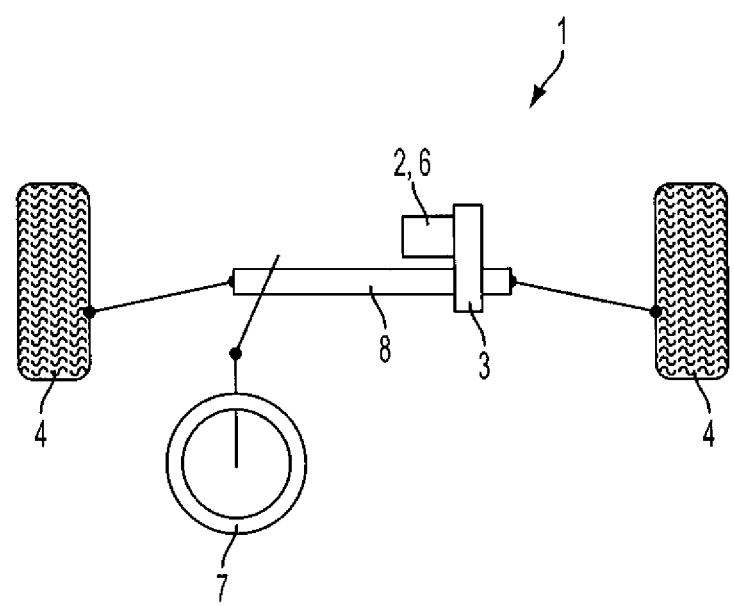
FIG. 1 shows an exemplary steering system.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a method can detect whether a steering aid has been deactivated based on inadequate measurements or misinterpreted signals and, further, whether the steering aid can be re-activated despite a warning message regarding an increase in coefficients of friction. Additionally or alternatively, a method in accordance with the present teachings can determine whether a steering aid should remain active if it was not previously deactivated.

In accordance with the present teachings, an exemplary embodiment of the method can be carried out after every restart or reactivation of the vehicle (i.e., at every ignition cycle). The method can determine whether a high coefficient of friction associated with the steering system was detected during the last operation cycle. A high coefficient of friction can indicate an increase in internal friction caused by defective components of steering system, such as, for example, corroded components of the steering gears such as a ball nut assembly. A high coefficient of friction can alternatively indicate an increase in external friction caused by friction occurring in the wheel suspension. For example, the high coefficient of friction can be caused by defective parts within a front wheel suspension system or friction external to the steering system of the vehicle such as unusually high friction caused by road conditions. Additional sources of friction external to the steering assist system can include friction caused by a pinion-rack gear mesh and a rack to rack housing. High coefficients of friction attributed to external friction can be falsely determined to be caused by defective components and the steering aid can be deactivated even though the components of the steering system are not defective. In accordance with the exemplary embodiment, following a deactivation of the steering aid, the method can detect whether the steering aid can be re-activated after the motor vehicle has been activated. In particular, the method can detect whether there is internal friction in the steering system. The method can detect that the steering aid has been deactivated and based on the type of friction determine whether the steering aid can be re-activated. For example, when the coefficient of friction is indicative of external friction, the steering aid can be re-activated. When the coefficient of friction is indicative of internal friction, the steering aid can remain deactivated. With the steering aid deactivated, the motor vehicle can be taken to a specialist workshop where the cause for an increase of the coefficient of friction can be remedied and the signal can be reset. Alternatively, the vehicle can be operated without a steering aid which can be inconvenient.

In accordance with the present teachings, an exemplary embodiment of the method can include generating a signal that indicates that a torque is to be applied to the steering wheel. For example, after the driver of the motor vehicle observes the signal, the driver can rotate the steering wheel without power assistance. The torque applied to the steering wheel can cause components of a motor, such as a servomotor, to be rotated. In an exemplary embodiment, when the servomotor is activated manually, it can act directly on the steering gear where the servomotor introduces negligible torque losses associated with the friction determination. When the rotation of the components of the motor are determined to be within a predetermined steering column torque range without power steering assistance, it can be determined that the internal friction does not act in a self-locking fashion on the steering gear. In view of this determination, the steering aid can be re-activated because it can be determined that the deactivation was based on external coefficients of friction and not internal coefficients of friction.

In accordance with present teachings, an exemplary embodiment of a method of controlling a steering aid can include monitoring coefficients of friction during the operation of the steering aid. For example, coefficients of friction can be determined and stored at predetermined intervals during operation of the motor vehicle. It is noted that the monitored coefficients of friction are not used to determine whether to deactivate the steering aid during operation of the vehicle. Instead, the coefficients of friction stored during operation of the motor vehicle can be used to determine the type of friction at the next attempt to activate the motor vehicle (e.g., after deactivation of the vehicle). For example, when a coefficient of friction is determined to exceed the predetermined range of coefficients of friction during operation, rather than deactivate the steering aid, the value of the coefficient of friction is stored and used to determine the type of friction that caused the coefficient of friction value when the motor vehicle is next activated. After each subsequent re-activation of the vehicle, the method of controlling the steering aid can be initiated until the cause of the increased friction is eliminated.

In accordance with present teachings, an exemplary embodiment of a method of controlling a steering aid can be stored in a control device such as a central control unit. In addition, the method can be initiated without driver interaction. For example, when the coefficients of friction recorded during the preceding operating cycle are determined to be within the predetermined range of coefficients of friction, the method can be omitted after activation of the vehicle where no driver signal is generated and the steering aid is activated. The method can be repeated until a coefficient of friction is determined to exceed the predetermined range of coefficients of friction. In that case, at the next activation of the vehicle a signal can be generated and the method can continue as described above.

FIG. 1 illustrates a steering system 1 for a motor vehicle such as a multitrack vehicle. The steering system 1 can comprise a steering aid 2, a mechanical assembly 3, front wheels 4, motor 6, steering wheel 7, and steering rack 8.

Steering aid 2 can assist in steering movement for the motor vehicle. For example, steering aid 2 can be a power steering system. Steering aid 2 can comprise a steering aid assist motor. Forces generated by steering aid 2 can be transmitted to the front wheels 4 through the mechanical assembly 3.

Mechanical assembly 3 can include various mechanisms that are connected to assist motor 6. For example, mechanical assembly 3 can comprise a ball and nut gear mechanism unit or a ball and nut spindle gear mechanism. Mechanical assembly 3 can be connected to an electric motor, auxiliary motor, a servomotor or the like via a belt or other means and steering movement can be assisted by the motor 6. Steering movement can be transmitted from the steering wheel 7 to the mechanical assembly 3 via a toothed steering rack 8, where the toothed steering rack 8 can be guided within a rack housing.

Figure 2:
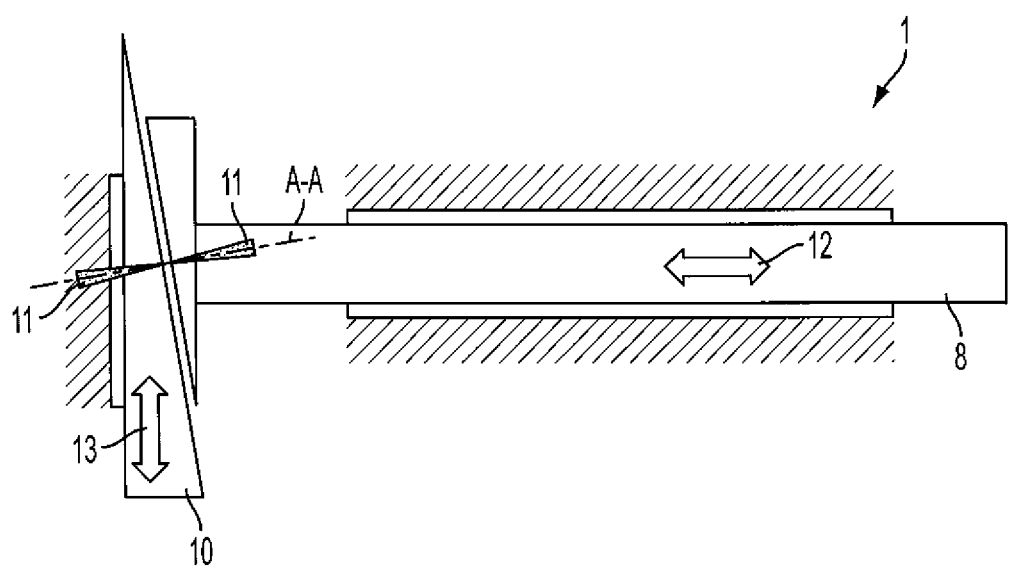
FIG. 2 shows a simplified mechanical representation of the high ratio ball nut of a portion of the exemplary steering system.

FIG. 2 shows a simplified mechanical representation of the high ratio ball nut of steering system 3, illustrating the direction of forces acting on a ball and nut assembly in a steering system. In FIG. 2, frictional cones 11 illustrate the angles of friction created between steering rack 8 and ball and nut 10 and line A-A represents a characterization of a normal force with respect to the surfaces of the toothed steering rack 8 and ball and nut 10. Frictional cones 11 can be dependent on the coefficient of friction which is a measure of the frictional force as a ratio of the normal force between the toothed steering rack 8 and the ball and nut 10. The apex angle of the friction cone 11 can increase as the coefficient of friction increases.

Linear movement of the toothed steering rack 8 can be converted into rotational movement of the ball and nut 10. For example, arrow 12 identifies the direction of linear movement in the driving direction of the toothed steering rack 8 and arrow 13 identifies the resulting direction of rotational movement of the ball and nut 10.

In an exemplary embodiment, when the directional vector of the driving force or direction of movement of the gear mechanism is within the friction cones 11, the frictional force implied by the normal force increases above the driving force along the surface. That is, when the frictional force within ball and nut assembly 10 becomes greater than the driving force applied by steering rack 8, the opposing forces cause the gear mechanism 3 to become locked. These exemplary frictional forces in gear mechanism 3 may be attributable, for example, to corrosion (e.g., rust or other defect attributable to rust), dirt, or mechanical defect in the ball and nut 10.

Figure 3:
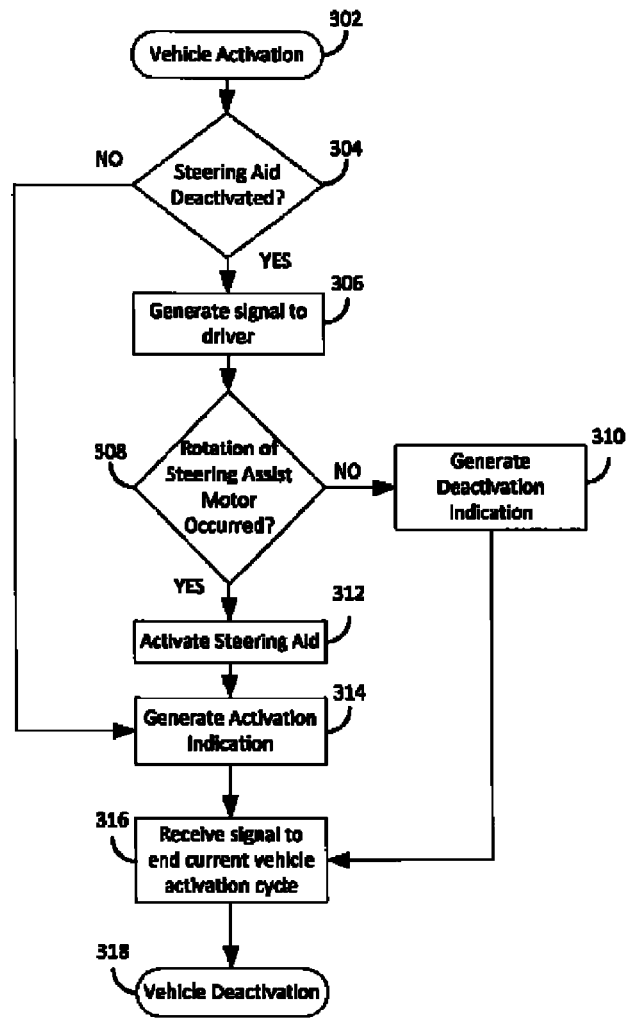
FIG. 3 shows an exemplary method of performing control of a steering aid for a steering system in accordance with the present disclosure.
Figure 4:
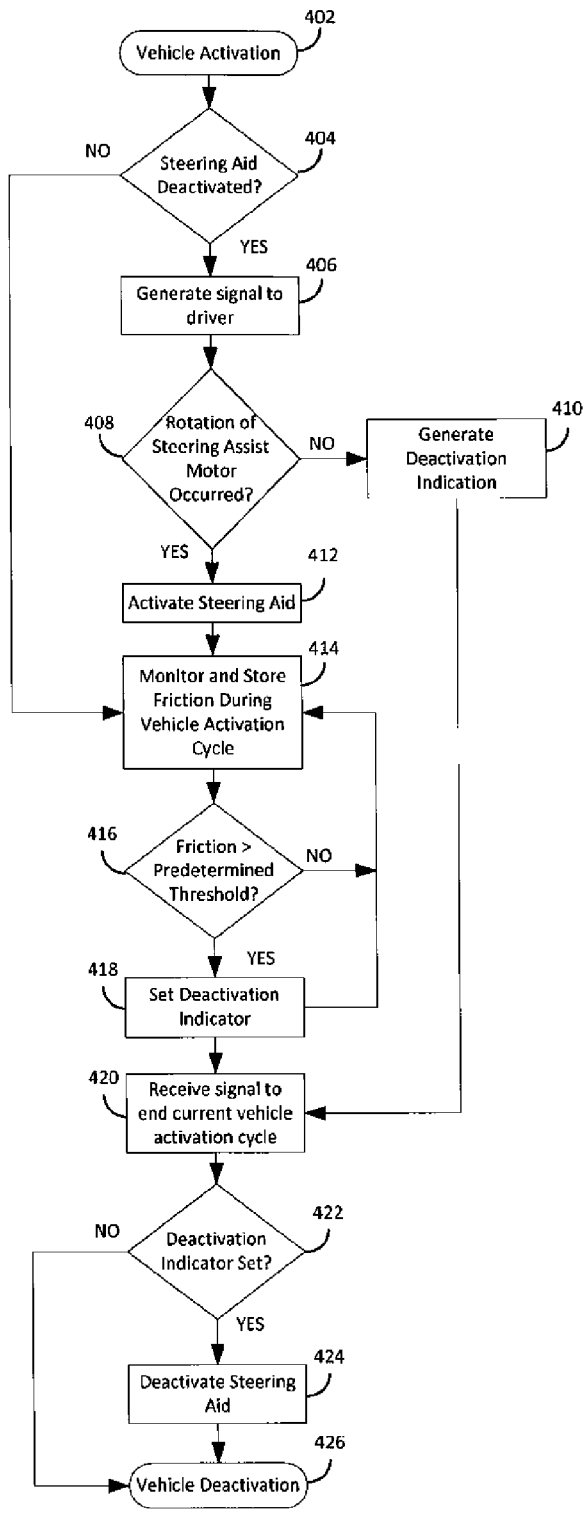
FIG. 4 shows another exemplary method of performing control of a steering aid for a steering system in accordance with the present disclosure.

FIGS. 3 and 4 illustrate flow charts of exemplary methods of controlling a steering aid in a motor vehicle. The methods will be discussed with reference to the exemplary steering system 1 illustrated in FIGS. 1 and 2. However, the methods can be implemented with any suitable steering system. In addition, although FIGS. 3 and 4 depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

FIG. 3 shows a method of controlling a steering aid for a steering system of a vehicle. At 302, a vehicle can be activated. Activation can be understood to include drive systems and/or auxiliary systems. For example, a drive unit can be an internal combustion engine, an electric motor, and/or a hybrid unit. Auxiliary systems can include a steering aid 2, ventilation, temperature control (e.g., heating, etc.), entertainment electronics and the like. In an exemplary embodiment, auxiliary systems can be activated without activating the drive system. In an exemplary embodiment, activation includes beginning an ignition cycle of the vehicle.

It can be determined whether a steering aid 2 has been deactivated at 304. For example, after activation of the vehicle, a control unit of the steering system 1 can determine whether a steering aid such as steering assist motor 6 has been deactivated in the steering system.

When the steering aid 2 has been deactivated, a signal can be generated to a driver at 306. For example, the signal generated can be a visible signal or an audible signal designed to capture the driver's attention and obtain the driver's input. The signal can indicate to the driver to apply a torque to the steering wheel 7 (i.e., rotate or turn the steering wheel 7).

At 308, it can be determined whether a rotation of the steering assist motor 6 has occurred. For example, when the driver rotates the steering wheel 7 without an auxiliary force being generated by the steering aid (e.g., the steering aid 2 and assist motor 6 are disengaged from the steering system) and as torque is applied to a steering column in connection with steering wheel 7, a force can be exerted on the steering assist motor 6. This force can cause components of steering assist motor 6 to rotate. When the force causes the steering assist motor 6 to rotate, a range of rotation can be determined. Any rotational movement can cause the control unit to determine that rotation has occurred. Alternatively, when the steering assist motor 6 rotates within a range, for example, of about 2 to 5 degrees, the control unit can determine that rotation has occurred in the steering assist motor 6.

When rotation of components of the steering assist motor does not occur without the steering aid, a deactivation indication can be generated at 310. For example, a visible or audible signal can be generated to communicate to the driver that the steering aid remains deactivated and cannot be reactivated at that time. Additionally or alternatively, a signal may be generated to communicate to the driver that the vehicle should be serviced prior to driving.

At 312, the steering aid can be activated when it has been determined that rotation of the steering assist motor has occurred. For example, steering assist motor 6 can be activated to assist the driver by providing power steering to the vehicle during the current activation cycle.

An activation indication can be generated at 314 when the steering aid has been activated. For example, a visible or audible signal can be generated to communicate to the driver that the steering aid has been activated. Additionally or alternatively, the driver may also be alerted that it is possible that the steering aid may be deactivated at the end of the of the current activation cycle (for example, if a high friction coefficient is again detected during the current activation cycle). Such an alert may include a recommendation to have the vehicle serviced. However, it is noted that the vehicle can continue a journey without the steering aid being activated.

At 316, a signal can be received to initiate ending the current vehicle activation cycle and at 318 the current vehicle activation cycle can be deactivated. For example, the control unit can receive a signal indicating that the driver has initiated deactivation of the current activation cycle of the vehicle. After receipt of this signal, the control unit can deactivate drive and/or axillary systems associated with the vehicle.

FIG. 4 shows an alternative method for controlling a steering aid for a steering system of a vehicle. At 402, a vehicle can be activated. Activation can be understood to include drive systems and/or auxiliary systems. For example, a drive unit can be an internal combustion engine, an electric motor, and/or a hybrid unit. Auxiliary systems can include steering aid 2, ventilation, temperature control (e.g., heating, etc.), entertainment electronics and the like. In an exemplary embodiment, auxiliary systems can be activated without activating the drive system. In an exemplary embodiment, activation includes beginning an ignition cycle of the vehicle.

It can be determined whether a steering aid 2 has been deactivated at 404. For example, after activation of the vehicle, a control unit of the steering system 1 can determine whether a steering aid such as steering assist motor 6 has been deactivated in the steering system, i.e., the power assist of the steering system has been deactivated.

When the steering aid 2 has been deactivated, a signal can be generated to a driver at 406. For example, the signal generated can be a visible signal or an audible signal designed to capture the driver's attention and obtain the driver's input. The signal can indicate to the driver to apply a torque to the steering wheel 7 where the activation of the steering assist motor (i.e., rotate or turn the steering wheel 7).

At 408, it can be determined whether a rotation of the steering assist motor has occurred. For example, when the driver rotates the steering wheel 7 without an auxiliary force being generated by the steering aid (e.g., the steering aid 2 and assist motor 6 are disengaged from the steering system) and as torque is applied to a steering column in connection with steering wheel 7, a force can be exerted on the steering assist motor 6. This force can cause components of steering assist motor 6 to rotate. When the force causes the steering assist motor 6 to rotate, any rotational movement can cause the control unit to determine that rotation has occurred. Alternatively, a range of rotation can be determined. For example, when the steering assist motor 6 rotates within a range, for example, of about 2 to 5 degrees, the control unit can determine that rotation has occurred in the steering assist motor 6.

In an exemplary embodiment, steering assist motor 6 can be rotated and the amount of rotation can be detected through various methods such as using a sensor, estimation, etc. When the components of the motor 6 rotate within a predefined steering column rotational range without power steering assistance, it can be determined that the steering gear is intact. For example, it can be determined that the ball and nut gear mechanism does not act in a self-locking fashion and the detected coefficient of friction can be attributed to an external frictional force and the steering aid 2 can be activated. When the rotation is not within the predefined steering column rotational range, it can be determined that the detected coefficient of friction is based on an internal frictional force and the steering aid can be deactivated and/or can remain deactivated.

In an exemplary embodiment, whether rotation of the steering assist motor has occurred can be indicative of a type of friction. For example, when the steering assist was previously deactivated and a rotation of the motor has been determined, the friction can be classified as being caused by a force external to the steering assist motor and the steering aid can be activated. Alternatively, when the steering assist was previously deactivated and a rotation of the motor has not been determined, the friction can be classified as being caused by a force internal to the steering assist motor and the steering aid can remain deactivated.

When rotation of components of the steering assist motor does not occur without the steering aid, a deactivation indication can be generated at 410. For example, a visible or audible signal can be generated to communicate to the driver that the steering aid remains deactivated and cannot be reactivated at that time. Additionally or alternatively, a signal may be generated to communicate to the driver that the vehicle should be serviced prior to driving. However, it is noted that the driver can make the decision to continue a journey without the steering aid being activated.

At 412, the steering aid can be activated when it has been determined that rotation of the steering assist motor has occurred. For example, steering assist motor 6 can be activated to provide a power steering assist to the steering system of the vehicle during the current activation cycle.

During the current activation cycle of the vehicle, friction within the steering system 1 can be monitored and stored at 414. For example, coefficients of friction can be monitored at a predetermined time interval where each coefficient of friction can be stored during the operating cycle of the vehicle. Alternatively, the monitored friction can be an estimation of friction based on at least in part of at least one of the torque applied to the steering wheel by the driver, the torque applied to the steering assist motor, and an amount of change in the movement of the steering assist motor.

The friction can be compared to a predetermined threshold value at 416 and when the friction is determined to be less than the predetermined threshold, the friction can continue to be monitored and stored periodically. When the friction exceeds the predetermined threshold, a deactivation indicator can be set at 418. For example, a flag can be set indicating that a high coefficient of friction was detected. The absence of a flag can be indicative of a detected coefficient of friction that did not exceed the predetermined threshold.

In an exemplary embodiment, a friction value can be detected that exceeds the predetermined threshold and the deactivation indicator can be set. However, a friction value less than the predetermined threshold can be further detected after the deactivation indicator is set. In that case, the deactivation indicator is cleared and the process continues to periodically monitor the friction.

At 420, the control unit can receive a signal to end the current vehicle activation cycle. For example, the control unit can receive a signal indicating that the driver has initiated deactivation of the current activation cycle of the vehicle.

At 422, it can be determined whether the deactivation indicator is set and when the deactivation indicator is set, the steering aid can be deactivated at 424 prior to deactivating the vehicle. For example, the control unit can deactivate drive and/or axillary systems associated with the vehicle. When the deactivation indicator is not set, the control unit can proceed to deactivating vehicle.

The methods illustrated in FIGS. 3 and 4 can be performed in one or more devices of the steering system 1. For example, the method can be performed by control device of the steering system 1 such as a central control unit. The control device can be implemented within any element of the steering system 1 such as steering aid 2. Alternatively, the control device can be a separate device from any of the above-described steering system 1 elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for controlling a steering aid for a steering system of a vehicle, comprising:
   generating a signal instructing a driver to rotate a steering wheel of the steering system while a steering assist motor is deactivated via fault detection;
   determining whether rotation of the steering wheel causes a rotation of the steering assist motor that meets a rotation criteria; and
   activating the steering aid when the steering assist motor rotation meets the criteria.

2. The method of claim 1, further comprising determining, when the vehicle is activated, whether the steering aid has been deactivated due to a deactivation signal triggered by monitored friction in the steering system.

3. The method of claim 1, wherein determining whether rotation of the steering wheel causes a rotation of a steering assist motor that meets a rotation criteria includes measuring rotational torque of a steering column of the steering system.

4. The method of claim 3, the rotation criteria comprises a predetermined steering column torque range.

5. The method of claim 1, further comprising:
   monitoring a friction estimate associated with the steering system after the steering aid has been activated;
   determining whether the friction estimate exceeds a predetermined threshold;
   generating an indication to deactivate the steering aid when the friction estimate exceeds a predetermined threshold; and
   deactivating the steering aid after receiving a signal to end a current vehicle activation cycle.

6. The method of claim 5, further comprising determining whether the steering aid of the steering system has been deactivated after the vehicle is next activated.

7. The method of claim 5, wherein the friction estimate is based in part on a torque applied by the steering assist motor.

8. The method of claim 7, wherein the friction estimate is further based on torque applied by the driver.

9. The method of claim 8, wherein the friction estimate is a coefficient of friction estimated based in part on a torque measurement of the steering assist motor.

10. The method of claim 5, further comprising:
    periodically monitoring the friction estimate associated with the steering system after the steering aid has been activated; and
    storing each friction estimate during the current vehicle activation cycle, wherein the indication to deactivate the steering aid when the friction estimate exceeds the predetermined threshold is generated based on the last friction estimate stored during the current vehicle activation cycle.

11. A system for controlling a steering aid for a steering system of a vehicle, comprising:
    a control unit configured to:
    subsequent to deactivation of a steering aid via fault detection and while a steering assist motor is deactivated, generate a signal instructing a driver to rotate a steering wheel of the steering system;
    determine whether rotation of the steering wheel causes a rotation of the steering assist motor that meets a rotation criteria; and
    activate the steering aid when the steering assist motor rotation meets the criteria.

12. The system of claim 11, wherein the control unit is further configured to determine, when the vehicle is activated, whether the steering aid has been deactivated due to a deactivation signal triggered by monitored friction in the steering system.

13. The system of claim 11, wherein the control unit is further configured to determine whether rotation of the steering wheel causes a rotation of a steering assist motor that meets a rotation criteria by measuring rotational torque of a steering column of the steering system.

14. The method of claim 13, the rotation criteria comprises a predetermined steering column torque range.

15. The system of claim 11, wherein the control unit is further configured to
    monitor a friction estimate associated with the steering system after the steering aid has been activated;
    determine whether the friction estimate exceeds a predetermined threshold;
    generate an indication to deactivate the steering aid when the friction estimate exceeds a predetermined threshold; and
    deactivate the steering aid after receiving a signal to end a current vehicle activation cycle.

16. The system of claim 15, wherein the control unit is further configured to determine whether the steering aid of the steering system has been deactivated after the vehicle is next activated.

17. The system of claim 15, wherein the friction estimate is based in part on a torque applied by the steering assist motor.

18. The system of claim 17, wherein the friction estimate is further based on torque applied by the driver.

19. The system of claim 18, wherein the friction estimate is a coefficient of friction estimated based in part on a torque measurement of the steering assist motor.

20. The system of claim 15, wherein the control unit is further configured to
    periodically monitor the friction estimate associated with the steering system after the steering aid has been activated; and
    store each friction estimate during the current vehicle activation cycle, wherein the indication to deactivate the steering aid when the friction estimate exceeds the predetermined threshold is generated based on the last friction estimate stored during the current vehicle activation cycle.

* * * * *